US006264815B1

(12) United States Patent
Pethig et al.

(10) Patent No.: US 6,264,815 B1
(45) Date of Patent: Jul. 24, 2001

(54) APPARATUS AND METHOD FOR TESTING USING DIELECTROPHORESIS

(75) Inventors: Ronald Pethig, Gwynedd; Gerardus Hendricus Markx, Glossop, both of (GB)

(73) Assignee: BTG International Limited, London (GB)

( * ) Notice: Subject to any disclaimer, the term of this patent is extended or adjusted under 35 U.S.C. 154(b) by 0 days.

(21) Appl. No.: 09/236,556

(22) Filed: Jan. 26, 1999

(30) Foreign Application Priority Data

Jul. 26, 1996 (GB) .................................................. 9615775
Jul. 28, 1997 (WO) .................................. PCT/GB97/02011

(51) Int. Cl.[7] ......................... G01N 27/26; G01N 27/447
(52) U.S. Cl. ............................................ 204/547; 204/643
(58) Field of Search ...................................... 204/547, 643

(56) References Cited

U.S. PATENT DOCUMENTS 4,326,934 4/1982 Pohl ..................................... 204/547
4,956,065 9/1990 Kaler et al. .......................... 204/547
5,489,506 * 2/1996 Crane ............................ 209/127.4 X

FOREIGN PATENT DOCUMENTS 41 27 405 A1 2/1993 (DE) .
WO 91/11262 8/1991 (WO) .
WO 92/07657 5/1992 (WO) .
WO 94/22583 10/1994 (WO) .

OTHER PUBLICATIONS

Burt et al., "An optical dielectrophoresis spectrometer for low–frequency measurements on colloidal suspensions", Journal of Physics E: Scientific Instruments, Nov. 22, (1989), No. 11, Bristol, GB, pp. 952–957.

Becker et al., "Separation of Human Breast Cancer Cells From Blood by Differential Dielectric Affinity", Natl. Acad. Sci. USA, 1995, pp. 1–5.

Becker et al., "Rapid Communication: The Removal of Human Leukaemia Cells From Blood Using Interdigitated Microelectrodes", J. Phys. D: Appln. Phys. 27, 1994, pp. 2659–2662.

Talary et al., "Rapid Publication: Dielectrophoretic Separation and Enrichment of CD34+ Cell Subpopulation From Bone Marrow and Peripheral Blood Stem Cells", Medical & Biological Engineering & Computing, Mar. 1995, pp. 235–237.

Markx et al., "Dielectrophoretic Characterization and Separation of Micro–Organisms", Microbiology, 1994, 140, pp. 585–591.

Markx et al., "Dielectrophoretic Separation of Cells: Continuous Separation", Biotechnology and Bioengineering, vol. 45, 1995, pp. 337–343.

Price et al., "Applications of a New Optical Technique for Measuring the Dielectrophoretic Behaviour of Micro–Organisms", Biochimina et Biophysica Acta 964, 1988, pp. 221–230, Elsevier.

Gascoyne et al., "Dielectrophoretic Separation of Mammalian Cells Studied by Computerized Image Analysis", Meas. Sci. Technol. 3, 1992, pp. 439–445.

* cited by examiner

*Primary Examiner*—Jill Warden
*Assistant Examiner*—John S. Starsiak, Jr.
(74) *Attorney, Agent, or Firm*—Pillsbury Winthrop LLP

(57) ABSTRACT

The behavior of particles is tested by placing a suspension of the particles in a chamber in which an electrode array is arranged to generate a spectrum of different frequency dielectrophoretic fields. The behavior of the particles at the different frequencies can be studied in a convenient and rapid manner. The apparatus and method can be used for a variety of purposes, including characterising the properties of specified particle types, or analysing the particle population in a fluid. It is also possible to expose the particles to different fluid parameters to extend the test spectrum in other senses.

29 Claims, 6 Drawing Sheets

APPARATUS AND METHOD FOR TESTING USING DIELECTROPHORESIS

BACKGROUND OF THE INVENTION

1. Field of the Invention

This invention relates to an apparatus and method for testing or investigating particles present in a fluid using dielectrophoresis, for example to determine the dielectrophoretic characteristics, or to identify the presence and/or relative concentration of a particular type or types of particle in the fluid.

2. Description of the Related Art

Dielectrophoresis (DEP) is the translational motion of a particle caused by polarisation effects in a non-uniform electric field. Unlike electrophoresis, no overall electrical charge on the particle is necessary for DEP to occur. Instead, the phenomenon depends on the magnitude and temporal response of an electric dipole moment induced in the particle, and on the force produced as a consequence of the electric field gradient acting across the particle. The magnitude of the dielectrophoretic force $F_{dep}$ on a spherical particle of radius a is given by:

$$F_{deo} = 2\pi a^3 \varepsilon_m \mathrm{Re}\left[\frac{(\varepsilon_p^* - \varepsilon_m^*)}{(\varepsilon_p^* + 2\varepsilon_m^*)}\right]\nabla E^2 \qquad (1)$$

where $\in_m$ is the absolute permittivity of the suspending medium, $\nabla\overline{E}$ signifies the gradient in the electric field, and $\in_p^*$ and $\in_m^*$ are complex permittivities of the particle and its surrounding medium, respectively. The complex permittivity is given by $\in^* = \in - j\sigma/\omega$, where $\in$ is the absolute permittivity, $\sigma$ is the electrical conductivity, $\omega$ is the angular frequency of the electric field and $j=\sqrt{-1}$. The term Re indicates that the real part of the expression within the square brackets of equation (1) is to be taken.

For particles suspended in a uniform aqueous electrolyte, the permittivity and conductivity of the suspending medium usually remains approximately constant over the frequency range 100 Hz to 100 MHz, whereas for the particles themselves these parameters can vary significantly. The term $(\in_p^* - \in_m^*)$ can therefore be positive or negative, and thus over an extended frequency range a particle can exhibit both positive DEP (movement towards areas of high field strength) and negative DEP (movement towards areas of low field strength).

Differences in the dielectrophoretic frequency response of particles can be used to selectively separate them by dielectrophoresis. An example of a particle separator which operates on this principle is described in International Patent Application WO-A1-9422583 in which a fluid containing two types of particles flows over electrodes producing a non-uniform electric field which is controlled so that the two types of particle experience different resultant forces and the fluid flow can remove one particle type preferentially. This separator can thus separate dielectrophoretically different particles or cells, but to be used effectively the dielectrophoretic behaviour of the two different particle types should be already known.

Pin-plate electrodes have been used for this purpose to determine the dielectrophoretic characteristics of particular particle types, but the procedures are laborious and time consuming.

Gascoyne et al Meas. Sci. Technol. 3 (1992) at pages 439 to 445, determines the DEP behaviour of 200–300 particles, specifically mammalian cells, by automatic image analysis. However, as with the use of pin-plate electrodes the DEP response of the cells can only be measured at a single frequency at a time. Because the frequency range of interest in DEP is relatively large (typically 100 Hz to above 10 MHz), and several data points per decade may be required, many single-frequency experiments need to be obtained for a sufficiently wide spectrum. Using this method it is therefore cumbersome and time-consuming to obtain a dielectrophoretic spectrum over a large frequency range, so as to facilitate the observation or manipulation of cells or particles.

There is therefore a need for a better way of determining the characteristics of particles in a fluid and/or of identifying one or more particle types present.

SUMMARY OF THE INVENTION

According to the present invention there is provided apparatus for testing particles present in a fluid comprising a chamber, a series of spaced electrodes in the chamber, means for applying electrical inputs of different frequencies to the respective electrodes to generate different dielectrophoretic fields in respective regions adjacent the electrodes, and means for detecting the presence of particles in the respective regions.

Preferably means are also provided for varying other parameters in the chamber which can affect the dielectrophoretic response of the particles. Such parameters can include the electrical conductivity and/or permittivity of the material in the chamber and/or its pH value. Preferably also means are provided for adjusting the voltage of the electrical inputs to the electrodes.

Additionally or alternatively, other forces may be used to enhance the movement of the particles. These may include hydrodynamic, ultrasonic, electrophoretic or optical forces.

The apparatus may be operated, for example, to determine the parameters which are appropriate for the separation and/or identification of a particular particle type in the fluid, or to differentiate between two particular types of particle present or to analyse a mixture of several particle types.

The regions in which the particles are to be detected will depend upon the geometrical configuration of the apparatus and the conditions at which it is operated. In one form of the invention, the electrodes are directed towards a further electrode or electrodes at a common or ground potential and the main areas of interest will lie in the spaces between the tips of the series of electrodes and the common electrode. Additionally or alternatively, the regions between adjacent electrodes of the series are to be investigated.

The means to detect the presence of particles in each of said regions may comprise a source of electro-magnetic radiation which is transmitted through the chamber to impinge upon particles present in the electrode gaps, and sensing means to detect the transmitted radiation not absorbed by said particles. There may be respective radiation sources for each region of interest adjacent the series of electrodes, or beam deflecting means may direct the radiation for a single source through the regions successively.

The electromagnetic radiation source may be a laser and the detector may be a charge coupled device (CCD). Alternatively, a video camera can be provided to monitor the radiation transmitted and a light source other than a laser can be employed. Automated image analysis means can then be used to interpret images thus obtained.

Other means to detect the presence of particles may include current and/or voltage sensing circuits, connected in series with each of said electrodes, and arranged so as to detect variations in field characteristics and/or impedance fluctuations within the electrode gaps. The information may then be used to indicate the presence of particles adjacent to the electrodes. Automatic electronic switch means may be provided for switching such sensing circuits between the electrodes. This may be effected sequentially.

Any of these detection techniques may additionally employ means for obtaining information about the temporal dielectrophoretic response, that is to say, the speed at which particles move to or from different dielectrophoretic field regions. Because the speed of movement of the particles is directly related to the forces acting on them, and because those forces are also related to the field characteristics, such temporal information (eg. rate of arrival of particles) may help to corroborate other measurements or may be used independently to identify and/or characterise particles.

The series of electrodes may be configured as a series of elongate fingers in a comb-like array with their tips directed towards a common electrode in the form of a linear conductive strip disposed opposite the array. In a modified configuration, the electrode array is arranged in a radiating pattern, for example of a circular or part-circular form. In one such arrangement, the electrodes are disposed about the periphery of a disc-shaped support such that their distal ends point towards a central region where the common electrode is situated. In the case of a circular electrode array the common electrode will be disposed centrally. In another example the electrodes may radiate outwards to point towards a peripheral common electrode and the chamber may be of any suitable shape and dimension to accommodate the electrode array.

The electrodes may be applied to the surface of a non-conducting substrate, such as glass or silicon, by conventional techniques used in the semi-conductor industry to apply conductive tracks. Alternatively, electrically conductive electrodes may be applied, eg. by screen printing, onto a porous membrane. The use of porous membranes may have other functions, such as for the removal or capture of larger particles. The porous membranes may also be used to move particles towards or away from the electrodes, or be used to help establish a conductivity or permittivity or pH gradient or other gradient within the chamber.

A separate fluid supply means may be connected to the chamber so as to supply additional fluid for flushing particles through the chamber and/or cleaning the chamber and/or modifying the overall conductivity and/or pH of the contents of the chamber.

According to another aspect of the invention there is provided a method of testing particles comprising locating the particles in a carrier fluid in a space in different regions of which they are subjected to a plurality of different dielectrophoretic fields and detecting the presence of the particles in the respective regions in order to characterise or identify the particles detected.

The method may be employed with all types of particle, including animate and inanimate biological particles such as cells, and other kinds of organic particle as well as particles of inorganic matter.

BRIEF DESCRIPTION OF THE DRAWINGS

Solely by way of example, the method and apparatus of the invention will now be described in more detail with reference to the accompanying drawings in which.

DETAILED DESCRIPTION

Figure 1:
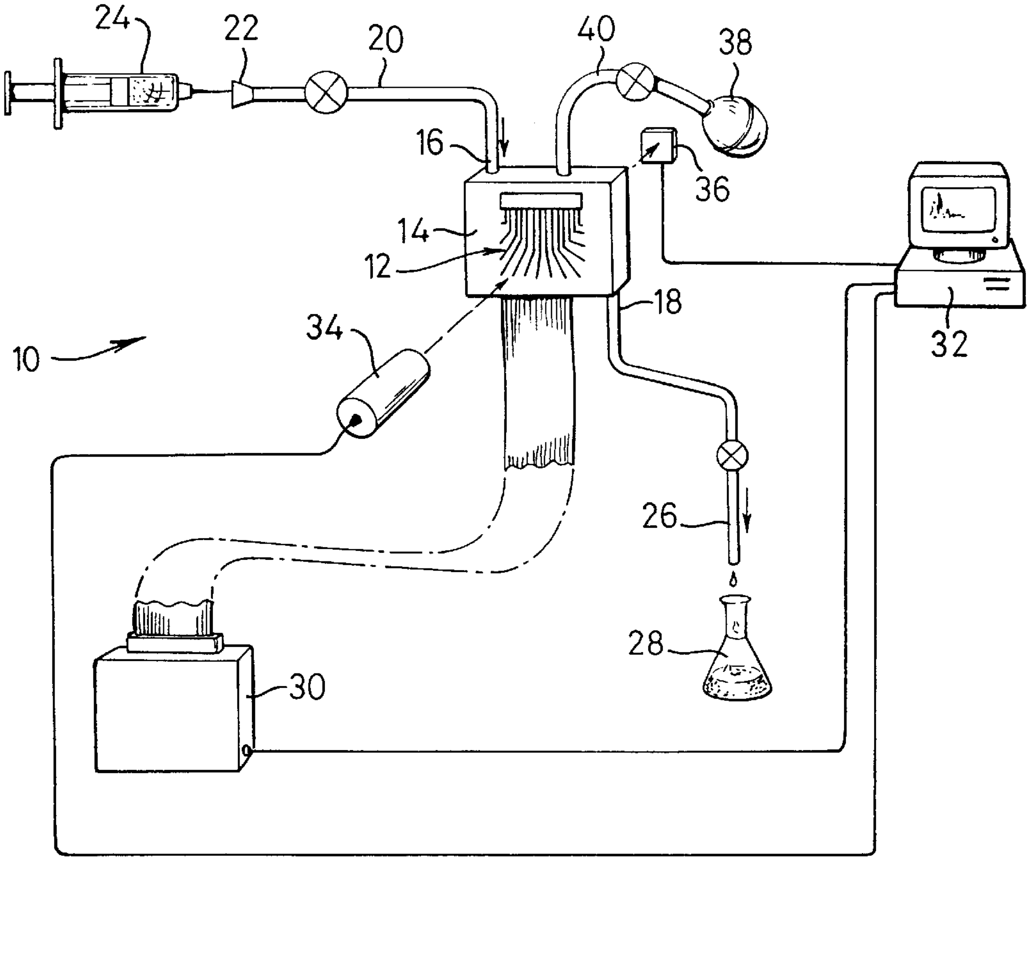
FIG. 1 is a schematic illustration of one form of apparatus according to the invention.

FIG. 1 shows an apparatus 10 for testing or characterising biological cells using dielectrophoresis. A multi-electrode array 12 housed within a chamber 14, consists of a comb-like series of spaced electrodes, shown in more detail in FIG. 2, the tips of which extend close to a common ground electrode 13. Connected to an inlet 16 of the chamber is one end of a synthetic plastics or a rubber tube 20. A syringe 24 is connected, through a bung 22, to the other end of the tube 20. The syringe initially contains a carrier liquid in which the cells to be studied are suspended. Through a second tube 26 connected to outlet 18 of the chamber 14, fluid can be drained from the chamber into a flask 28. The individual electrodes of the electrode array 12 are connected to a signal generator 30 which is operated under the control of a micro-computer 32. A laser 34, which is also under the control of micro-computer 32, is arranged to direct a beam through the chamber 14. A detector 36 sensitive to the wavelength of the laser beam, such as a charged coupled device (CCD) or a similar photosensitive device, is positioned on the opposite side of the chamber to the laser 34. The micro-computer 32 is also programmed to store and process the signals obtained by the detector 36. Optionally, pump 38 can deliver fluid to the chamber via tube 40.

In operation, the cell suspension is introduced from the syringe 24 via tube 20, or pump 38 via tube 40, into chamber 14. Under control of micro-computer 32 the signal generator 30 activates the electrodes in the multi-electrode array 12 simultaneously at different frequencies so that a series of different dielectrophoretic fields are established, in particular between the tips of the individual electrodes and the common electrode 13. Attraction or repulsion forces experienced by individual cells in these fields can urge the cells preferentially towards or repel them from different dielectrophoretic regions. The liquid may be at rest while the dielectrophoretic fields are established and the cells are distributed in accordance with the forces they experience from the fields, or a closed circulatory flow can be established, so that the particles will continue to be exposed to different field forces unless they have been captured by a force gradient in any particular region.

The signal generator provides a spectrum of different frequency fields, eg. from 100 Hz to 100 MHz, in the chamber 14. By establishing the different frequency dielectrophoretic fields in different regions of the chamber, it is possible to observe any tendency the cells of any specific cell type have to accumulate close to the tips of particular electrodes, due to being subjected to repulsion and/or attraction forces by the fields at the different regions. Under the control of the micro-computer 32, the laser 34 illuminates the regions of the different fields sequentially. The radiation transmitted to the CCD 36 will be obscured to a greater or lesser extent, depending upon the amount of cells in each region so that the CCD 36 detects different radiation intensities in accordance with the amount of cells which have accumulated around particular electrodes. It is of course possible to obtain measurements simultaneously from the regions of the different fields by using an array of lasers and associated detectors.

Digital signals of the radiation intensities obtained are indicative of the amount of absorption at each of the regions of the multi-electrode array and are stored in the micro-computer 32, together with information, from the signal generator 30, about the frequencies of the fields at these absorption regions. Also stored in the micro-computer are data on other parameters which may influence the behaviour of the particles in the dielectrophoretic fields and so be able to be used to identify and/or characterise the particles. For example, the conditions in the carrier fluid in the chamber, such as the conductivity and pH may be relevant. This data may be entered manually from initial measurements or may be monitored during operation. The information gathered may, for example, be compared with a look-up table, stored within the micro-computer 32, to derive information about the identity of the cells.

Other conventional counting methods may be used, including automatic image analysis, or making optical density measurements. It will be appreciated that using image enhancement algorithms, computerised images can be obtained, stored and analysed.

From a series of tests a database of spectra of different cells and/or mixtures can be established or expanded to enable rapid identification of cells.

Figure 2:
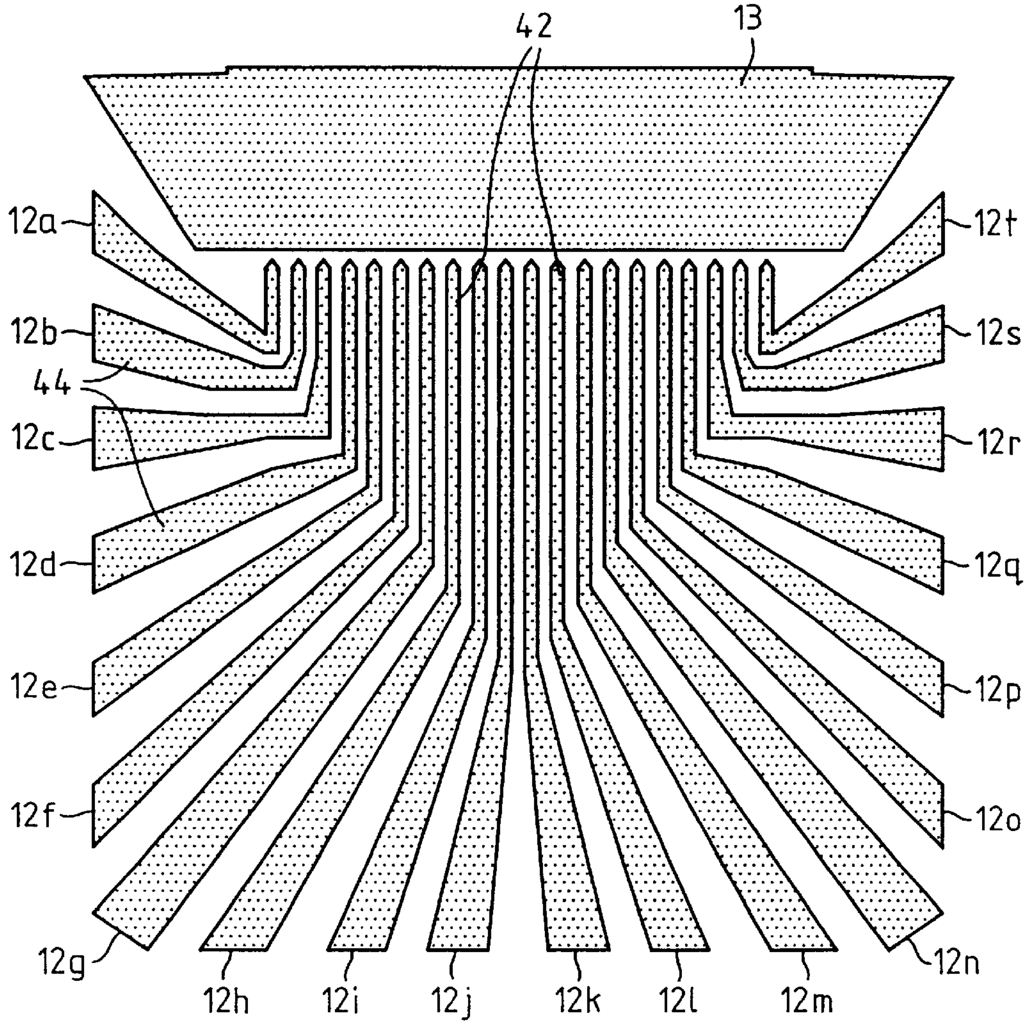
FIG. 2 is a larger scale plan view of a multi-electrode array used in the apparatus of FIG. 1.

One form of electrode array 12 is shown in more detail in FIG. 2. It is fabricated using photo-lithography and comprises twenty gold plated conductors 12*a,b,c*. . . 12*t* which provide a series of parallel electrodes 42 each 21 μm wide and spaced apart a similar distance. The tapered tips of the electrodes extend close to the common ground electrode 13 and at their other ends splayed tracks 44 continue from the electrodes to broad area pads (not shown) at which the external electrical connections are made.

Figure 3:
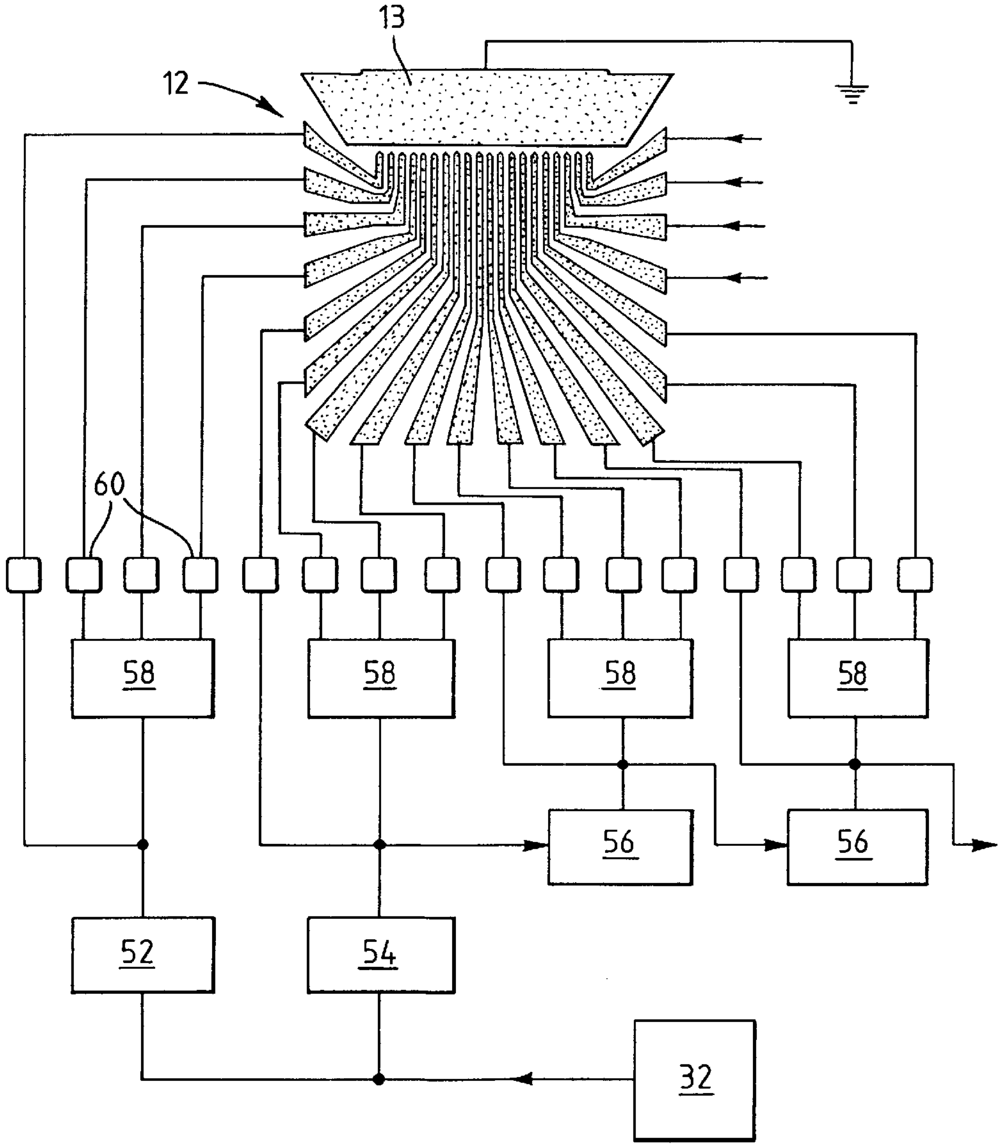
FIG. 3 is a block diagram showing the signal generator of FIG. 1 in more detail.

FIG. 3 shows the signal generator 30 in more detail and its connections to the electrode array. The signal generator comprises crystal oscillators 52,54 operating at frequencies of 10 MHz and 1 MHz respectively. From the primary frequency outputs of the oscillators, lower frequencies are obtained using decade and binary counters, which may consist of 74-series decade counter TTL devices 74LS90. A first group of three counters 56, only two of which are illustrated, are connected in cascade to operate as divide-by-ten devices. The frequency oscillators 52,54 and the counters 56 are each connected to the further group of five counters 58, only four of which are illustrated, which operate as divide-by-two counters to provide a series of outputs of frequencies in the ratios of 0.5, 0.25 and 0.125 to their input frequency. The generator thus obtains frequencies of 10, 5, 2.5, 1.25 and 1 MHz, 500, 250, 125, 100, 50, 25, 12.5, 10, 5, 2.5, 1.25 and 1 kHz, and 500, 250 and 125 Hz. Through voltage control amplifiers 60, the 0–5V square-wave signals from the counters are converted to square-wave signals of ±5V which are supplied to the electrodes of the array 12.

A complete dielectrophoresis spectrum of a particle suspension can thus be obtained in a single experiment by applying signals of equal voltage but different frequency to respective electrodes in the multi-electrode array. Voltages in the range 0–24V pk-pk could be produced, as determined by the computer control, but typically voltages of between 2 and 5V pk-pk were employed in the experiments.

A specific example of the use of the apparatus of FIGS. 1 to 3 with reference to experimental testing carried out by the inventors now follows.

The chamber 14 is rectangular and has a volume of 50 μL. The electrode array 12 is formed on one wall and the internal space of the chamber is built up above the electrodes by using a 200 μm polytetrafluoroethylene (PTFE) spacer disposed between and sealed to the opposite walls using epoxy resin as a water seal. An aqueous suspension of cells, having a predetermined electrical conductivity, was pumped (using a Gilson Minipuls 3 system) into and out of the chamber via lmm inner bore polyvinyl chloride (PVC) and silicone tubing 16 and 18.

The particles used were yeast cells *Saccharomyces cerevisiae* strain RXII. The yeast was grown overnight at 30° C. in a medium of pH 5 consisting of 5 g/L yeast extract (Oxoid), 5 g/L bacterial peptone (Oxoid) and 50 g/L sucrose, harvested and washed four times in deionised water. The suspension liquid also contained non-viable yeast cells obtained by heat treatment for 20 min at 90° C., and washed four times in deionized water. The optical density at 635 nm of the final suspensions used was of the order of 0.3–0.4 in a cuvette of 1 cm path length, corresponding to concentrations of the order 7–9×$10^6$ cells/ml.

The multi-electrode array 12 was monitored under a microscope (not shown) coupled to a video camera and monitor having a CCD 36. After introducing a cell suspension into the chamber, the fluid flow was stopped and the electrodes 12 energised. Cells were observed to move directly to nearby electrodes, and also to migrate from some areas in the electrode array towards other areas. After equilibrium conditions were established, which took of the order 10 seconds or less, the distribution of cells over the multi-electrode array 12 and in the region between the electrode 12 tips and the common electrode 13 were video recorded. Cell counts were then made in the areas between the electrodes and the area near the tips of the electrodes from the images captured by the CCD 36.

Figure 4A:
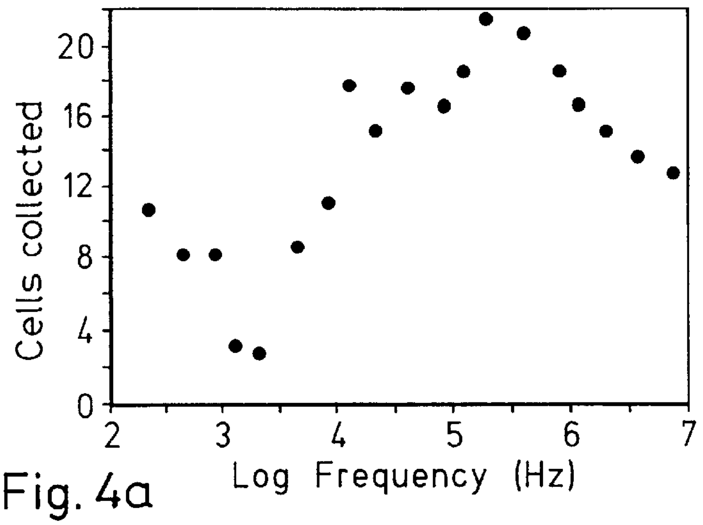
FIGS. 4*a*, 4*b* and 4*c* are graphs showing the number of cells collected in the use of the apparatus of FIG. 1 under different conditions.

In a suspending medium of conductivity around 0.6 mS/m, viable yeast cells moved from electrodes energised at frequencies around 10 kHz and below, and were attracted towards those operating at 50 kHz and higher. Non-viable yeast cells however were repelled from the electrodes operating at the frequencies of 1 MHz and above, and collected around those energised at frequencies of 500 kHz and lower. The resulting distribution is shown in the graph in FIG. 4*a*, and corresponds to the combined effect of cells moving directly to nearby electrodes under positive DEP, as well as to cells moving from areas of negative DEP to positive DEP.

Figure 4B:
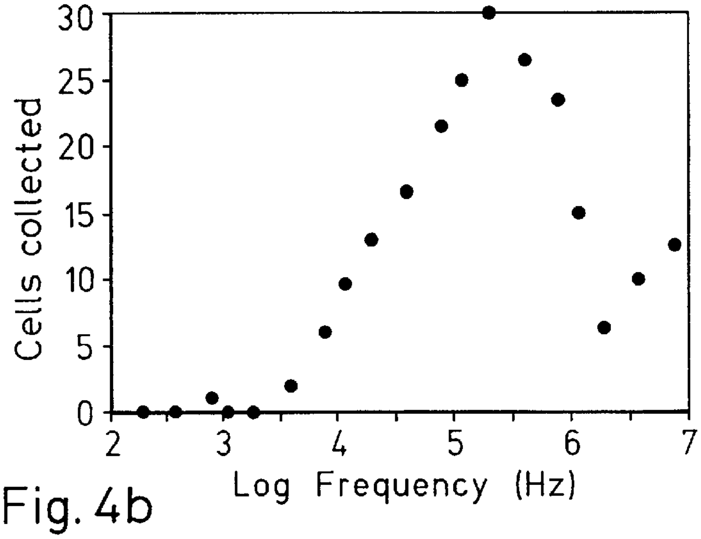
Figure 4C:
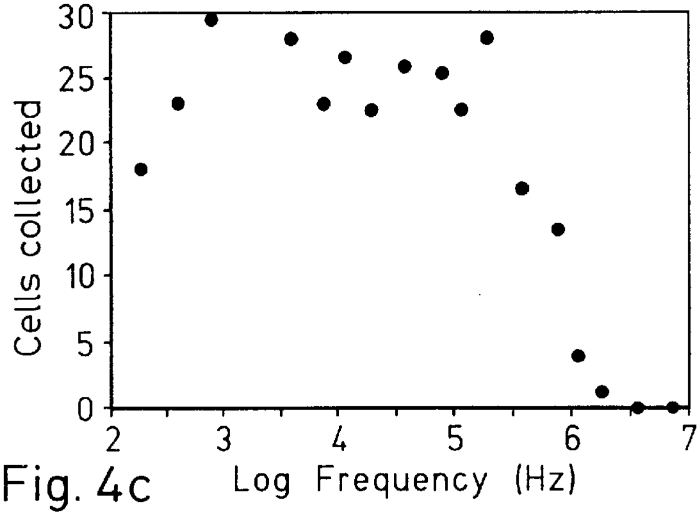

FIGS. 4*b* and 4*c* show the distribution of cells with the suspending fluid treated to change its conductivity by the addition of small amounts of a concentrated NaC1 solution. The resulting conductivity of the suspending medium was measured with a HP4192A impedance analyser using platinum-black electrodes of cell constant 1.58 $cm^{-1}$.

FIG. 4*b* shows the results of a test, using only viable yeast cells, in a medium of conductivity around 6 mS/m. The collection spectrum of the cells exhibits a strong peak around 0.1 MHz to 1 MHz and falls off to nil by 1 kHz. From a further similar test, FIG. 4*c* shows the collection spectrum of non-viable yeast cells in a medium of conductivity around 0.45 mS/m and, although a degree of experimental scatter is present, it shows the concentration of the cells at lower frequencies, falling off almost to zero at 1 MHz.

Characteristic frequency profiles can be established for different types of particles. From such data and particle counts at appropriate frequencies for the particle types present in a mixture it is possible to establish the relative concentrations of mixtures of known particles in a fluid medium.

In a time following these cell displacements in the tests described, other less dominant cell motions were observed.

These motions took the form of cells appearing to stream from the common electrode and across the electrodes energised at the lower frequencies, to finally settle on the electrodes energised at frequencies in the range from around 5 kHz to 500 kHz. This phenomenon might be due to low-frequency electrophoresis effects. However, non-viable cells were also sometimes observed to flow from the common electrode towards the electrodes energised at the MHz frequencies, and so other DEP driven forces may also be responsible. With increasing time these additional cell migrations distorted the DEP collection spectrum because they led to an over-estimate of positive DEP effects. This problem was overcome by gently pumping the cell suspension over the electrode array to agitate it. The induced hydrodynamic forces assisted a more even distribution of the cells in each frequency region, removed non-attracted cells, and reduced the convection-like streaming of cells without interfering with the DEP effects. If the flow rate became too high, cells that were only held by relatively small DEP forces were removed from the electrodes, and thus gave rise to a reduced estimate of the cell number at these electrodes.

Figure 5:
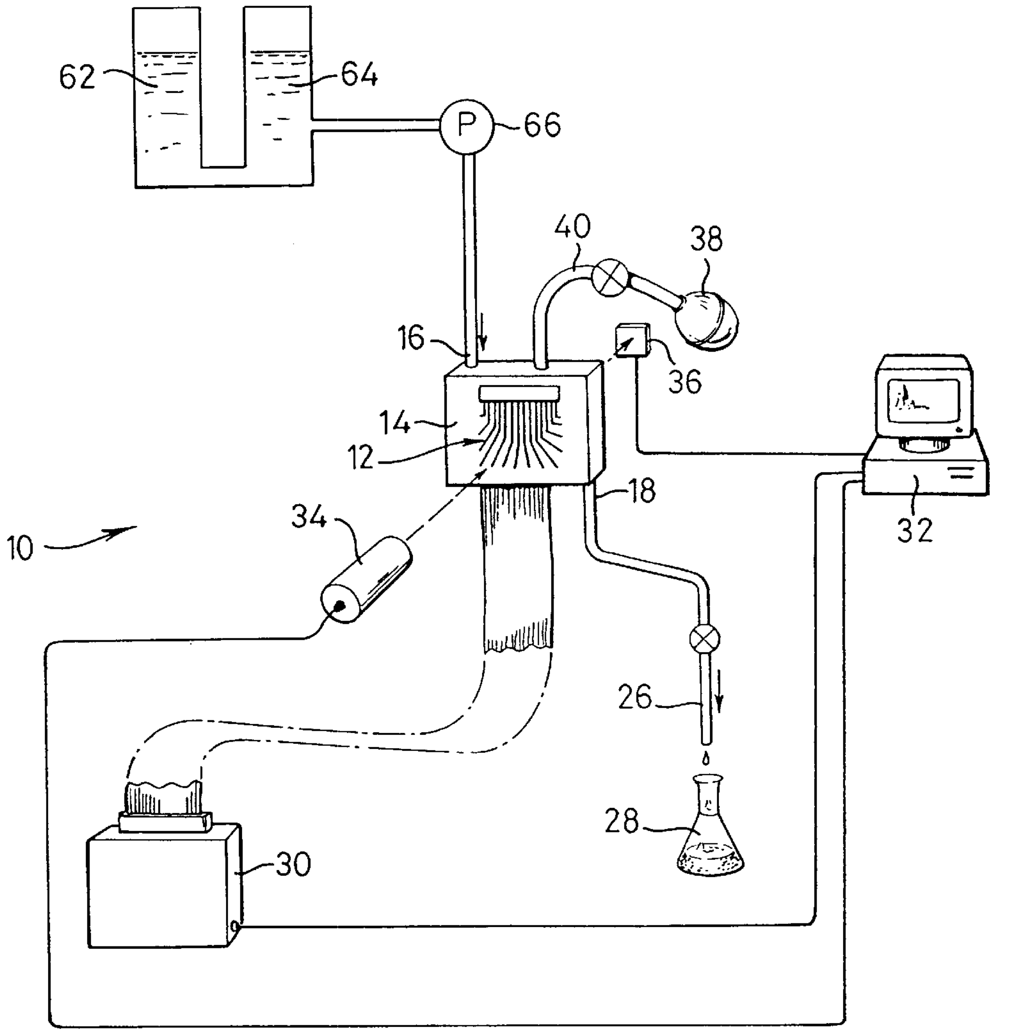
FIGS. 5 and 6 are schematic illustrations of two modified forms of apparatus according to the invention.

The illustrative experiments show measurements of the DEP responses measured with constant medium conductivity and permittivity. It is within the scope of the invention to produce conductivity and/or permittivity gradients over the electrode arrays so that further DEP spectra can be obtained in a single run of cells or mixtures at various conductivities and permittivities and or pH values. FIG. 5 illustrates a modification of the apparatus in FIG. 1, in which the particle-containing fluid is divided between two containers 62,64 and the conductivity increased in the container 62. When pump 66 drives liquid to the chamber, the conductivity of the liquid in the chamber will increase progressively as liquid from the chamber 62 is drawn into and mixes with the liquid already in the chamber 64. In a similar manner, a pH gradient in the carrier fluid could also reveal, at the lower frequencies, effects associated with changes in the surface charge of a cell. Such images could also be used for bioparticle characterisation and identification, of use for example in the clinical identification of micro-organisms.

In another development of the techniques described above, by placing an extended number of such multi-electrode arrays 12 in a conductivity gradient, permittivity gradient or pH gradient, for example, the dielectrophoretic frequency spectrum as a function of that parameter can also be obtained in a single experiment.

Figure 6:
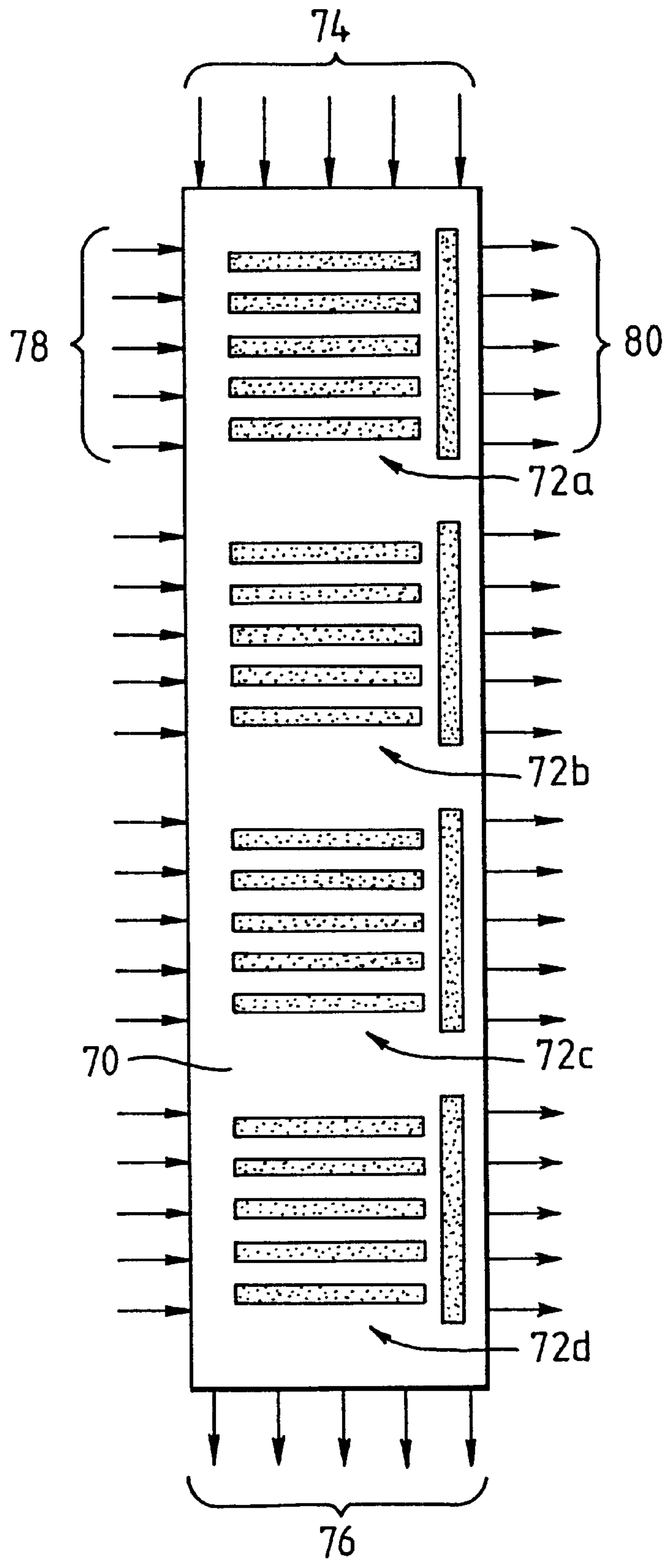

FIG. 6 illustrates schematically an apparatus of this form. An elongate chamber 70 has a series of electrode arrays 72*a*,72*b*,72*c*,72*d* set at intervals along its length. These arrays are indicated purely diagrammatically but may each take the form of the array already described with reference to FIG. 2. Inlet and outlet porting 74,76 respectively, at opposite ends of the chamber 70 are provided for the suspension of particles to be tested. Both the inlet and outlet porting are preferably arranged so as to give a relatively uniform velocity flow across the width of the chamber, eg. comprising a series of ports spaced across the width of the chamber. In the zone of each electrode array 72 along the length of the chamber 70, groups of inlet and outlet ports 78,80 are provided for passing a cross-flow of a further fluid over the array. For each array, a fluid having a different conductivity is used for the cross-flow, for example, the conductivity being progressively greater for each successive array 72*a*,72*b*,72*c*,72*d*.

In operation, the material under investigation is introduced into the chamber through the porting 74 and the electrode arrays are energised. Fluid flows are then directed through the cross-flow ports 78,80, over the arrays, each successive array 72*a*,72*b*,72*c*,72*d* being exposed to a medium of greater conductivity than its preceding array. A particle count is then performed at each array by means (not shown) which can take any of the forms mentioned earlier herein. If the particles are less strongly attracted by the dielectrophoretic forces as the conductivity of the medium increases, the particle count will be reduced at each successive array and a spectrum of values can be obtained from the different arrays. When the required data has been collected of the particle count, the cross flows are terminated and the debris is cleared by a flushing flow along through the ports 78,80.

It will be understood without further illustration that the method described can be employed to test dielectrophoretic behavior with variations of other parameters, such as the permittivity or pH value of the surrounding fluid medium. Where appropriate, similar experiments can be run in which the conductivity or other variable parameter is reduced in the direction of main fluid flow through the chamber. Added versatility and applications can be achieved by coating the electrode arrays with reactive chemicals.

A wide variety of particles and non-biological cells may be studied by the use of the invention, employing suitable electrode arrays and test parameters. For example, the order of magnitude of the gap between the series of electrodes and the common electrode could be altered so as to accommodate and test different bioparticles species such as viruses, prions, proteins, molecules or DNA, or chemically activated particles such as coated latex beads.

The fields of use of the invention include the dielectrophoretic characterisation of a presumed dominant, single-type, particle (animate or inanimate) suspended in an aqueous medium or other fluid, such as may be required for the inspection of liquefied food products, biological fluids such as urine or plasma, or of liquids sampled during a chemical production process. The method described provide rapid means for ascertaining the most appropriate conductivity value of the fluid and voltage frequency range to be used in the dielectrophoretic separation of a dominant particle type from the fluid, for example, the conductivity and frequency values required to obtain separation using positive or negative dielectrophoresis.

The procedure could be repeated on samples that had already been processed through a dielectrophoresis separation stage, so as to further characterise a separated particle or ascertain the experimental conditions required to separate other particle types which might have been present in the original sample.

Another area of application would be in the dielectrophoretic characterisation of fluid samples, which should have a relatively homogeneous population of particles. Examples here include the monitoring of yeast cells in fermenting beer or wine, or of the lactic acid bacteria used as starter colonies in the fermentation of yogurt or cheese, or of crystalites formed in a chemical production process. In these cases a rapid means would be provided for checking the presence, viability and homogeneity of the particle type. For example, the relative compositions of dead and live yeast, or of the starter organisms in yogurt (typically streptococci and lactobacilli) would be given by the dielectrophoretic spectra produced as a function of conductivity, as well as an indication of the presence of spoiling impurities (eg. of yeast in yogurt or of lactic acid bacteria in beer). The homogeneity (size and chemical composition) of crystallites sampled during a chemical process could also be monitored.

The invention could also be employed for the dielectrophoretic analysis of fluids containing several particle types. Examples here would include biological fluids such as urine, where the relative composition of Gram-positive and Gram-negative bacteria could be ascertained by obtaining dielectrophoretic spectra over a range of conductivity and pH values, for example to identify the presence of a dominant infective organism.

What is claimed is:

1. An apparatus for testing particles present in a fluid, the apparatus comprising:

a chamber;

a series of spaced electrodes in the chamber;

means for applying electrical inputs of different frequencies to the respective electrodes to generate different dielectrophoretic fields of different frequency in respective regions adjacent the electrodes; and means for detecting a presence of particles in the respective regions, wherein:

the electrodes are directed towards at least one further electrode at a common or ground potential, the electrical inputs establish the different dielectrophoretic fields simultaneously.

2. A method of testing particles, the method comprising:

locating the particles in a carrier fluid in a space in different regions of which the particles are subjected to a plurality of different dielectrophoretic fields of different frequency; and detecting a presence of the particles in the respective regions in order to characterise or identify the particles detected.

3. The method according to claim 2, wherein the particles are carried in a fluid that is circulated through said space.

4. The method according to claim 2, wherein the presence of the particles is detected by measuring a transmission of electromagnetic energy through the respective regions.

5. The method according to claim 2, wherein the fields are generated employing a series of spaced electrodes and electrical measurement means are connected to the electrodes to determine the presence of the particles in the fields adjacent the respective electrodes.

6. The method according to claim 2, wherein a parameter of the fluid carrying the particles is varied to test for any variation of response obtained thereby.

7. The method according to claim 6, wherein said parameter is varied over a period of time while detecting any particles present.

8. The method according to claim 7, wherein said space comprises a plurality of zones in which said fluid parameter is different from zone to zone and particles in the fluid in each zone are subjected to the plurality of different dielectrophoretic fields for detection of particles in the respective zones.

9. An apparatus for testing particles present in a fluid, the apparatus comprising:

a chamber;

a series of spaced electrodes in the chamber;

means for applying electrical inputs of different frequencies to the respective electrodes to generate different dielectrophoretic fields of different frequency in respective regions adjacent the electrodes; and means for detecting a presence of particles in the respective regions.

10. The apparatus according to claim 9, wherein the series of electrodes is configured as a series of elongate fingers in a comb-like array with their tips directed towards a common electrode in a form of a linear conductive strip disposed opposite the the series of electrodes.

11. The apparatus according to claim 10, wherein the series of electrodes is arranged in a radiating pattern.

12. The apparatus according to claim 11, wherein the pattern is of circular or part-circular form.

13. The apparatus according to claim 11, wherein the electrodes are disposed about a periphery of a disc-shaped support such that distal ends of the electrodes point towards a central region where the common electrode is situated.

14. The apparatus according to claim 11, wherein the electrodes radiate outwards to point towards a peripheral common electrode.

15. The apparatus according to claim 9, wherein the detection means comprises at least one electromagnetic radiation source arranged to direct radiation through said regions to impinge on the particles and at least one sensing means to thereby provide a signal for each said region indicative of the presence of particles in said region.

16. The apparatus according to claim 9, wherein the detection means comprises sensing means for measuring variations in electrical characteristics in said regions.

17. The apparatus according to claim 16, wherein said sensing means are connected to the electrodes serially for said measurements.

18. The apparatus according to claim 9, wherein the detection means comprises means for obtaining time-dependent data indicative of at least one of a rate and a quantum of displacement of particles per unit time.

19. The apparatus according to claim 9, further comprising means for varying a parameter of the fluid carrying the particles progressively during an operation of the apparatus.

20. The apparatus according to claim 9, wherein the electrodes are arranged as a bank of laterally spaced elongate elements.

21. The apparatus according to claim 9, further comprising means for varying a parameter of the fluid in the chamber while exposing the particles therein to the dielectrophoretic fields, whereby a reaction of the particles to said variation is tested.

22. The apparatus according to claim 9, further comprising a plurality of said series of spaced electrodes arranged in spaced zones of the chamber and means for supplying fluids having different parameters to the respective zones and for detecting the presence of particles in each of said zones.

23. The apparatus according to claim 9, further comprising computer means for at least one of controlling said means for applying electrical inputs and for processing signals from said detecting means.

24. The apparatus as claimed in claim 9, wherein the electrical inputs establish the different dielectrophoretic fields simultaneously.

25. The apparatus as claimed in claim 9, wherein the electrodes are directed towards at least one further electrode at a common or ground potential.

26. The apparatus as claimed in claim 9, wherein a spectrum of frequencies of the dielectrophoretic fields is in a frequency range of 100 Hz to 100 MHz.

27. The apparatus as claimed in claim 9, wherein a spectrum of frequencies of the dielectrophoretic fields is in a frequency range of 100 Hz to 10 MHz.

28. A method of testing particles, the method comprising:

locating the particles in a carrier fluid in a space in different regions of which the particles are subjected to a plurality of different dielectrophoretic fields of different frequency; and detecting a presence of the particles in the respective regions in order to characterise or identify the particles detected and in that the fields are established simultaneously.

29. A method of testing particles, the method comprising:

locating the particles in a carrier fluid in a space in different regions of which the particles are subjected to a plurality of different dielectrophoretic fields of different frequency; and detecting a presence of the particles in the respective regions in order to characterise or identify the particles detected and in that the fields are established simultaneously by a series of individual spaced electrodes in the chamber, the electrodes being directed towards a further electrode or electrodes at a common or ground potential such that a spectrum of fields of different frequency is provided.

* * * * *

UNITED STATES PATENT AND TRADEMARK OFFICE

CERTIFICATE OF CORRECTION

PATENT NO. : 6,264,815 B1
DATED : July 24, 2001
INVENTOR(S) : Pethig et al.

It is certified that error appears in the above-identified patent and that said Letters Patent is hereby corrected as shown below:

Title page,
Item [30] Foreign Application Priority Data, please delete "Jul. 28, 1997 (WO) .............PCT/GB97/02011" please add:
-- Related U.S. Application Data
[63] Continuation of application No. PCT/GB97/02011, Jul. 28, 1997. --

Signed and Sealed this

Fourteenth Day of May, 2002

*Attest:*

JAMES E. ROGAN

*Attesting Officer*

*Director of the United States Patent and Trademark Office*